(12) United States Patent
Desai et al.

(10) Patent No.: US 6,857,777 B2
(45) Date of Patent: Feb. 22, 2005

(54) DUAL TEMPERATURE INDICATOR STICK HOLDER

(75) Inventors: Pramathesh Desai, Bordentown, NJ (US); Victor I. Deonarine, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 122 days.

(21) Appl. No.: 09/682,843

(22) Filed: Oct. 23, 2001

(65) Prior Publication Data

US 2003/0076868 A1 Apr. 24, 2003

(51) Int. Cl.[7] .......................... G01K 1/00; G01K 11/00; B43K 27/00
(52) U.S. Cl. ..................... 374/208; 374/160; 374/162; 401/31
(58) Field of Search ................. 374/160, 208, 374/161, 162, 155; 401/16, 17, 19, 31; 279/2.02

(56) References Cited

U.S. PATENT DOCUMENTS

| | | | | |
|---|---|---|---|---|
| 1,603,713 A | * | 10/1926 | Peterson | 401/93 |
| 1,983,728 A | * | 12/1934 | Nicolino | 401/93 |
| 2,020,676 A | * | 11/1935 | Ellis et al. | 374/160 |
| 2,656,605 A | * | 10/1953 | Schlieder | 33/41.4 |
| 2,785,654 A | * | 3/1957 | Lundberg, Sr. et al. | 401/93 |
| 3,479,876 A | * | 11/1969 | Kliewer | 374/155 |
| 4,468,146 A | * | 8/1984 | Tabachnik | 401/88 |
| 4,762,493 A | * | 8/1988 | Anderson | 401/49 |
| 5,011,445 A | * | 4/1991 | Nakasuji et al. | 446/14 |
| 5,318,372 A | * | 6/1994 | Besthorne | 401/19 |
| D360,223 S | * | 7/1995 | Lamber | D19/55 |
| 6,113,520 A | * | 9/2000 | Greiner | 401/8 |
| 6,290,413 B1 | * | 9/2001 | Wang | 401/30 |
| 2002/0032069 A1 | * | 3/2002 | Arrison | 473/36 |

OTHER PUBLICATIONS

Omega Engineering, Inc., "The Temperature Handbook", vol. 29, p. F–10 (item cited "OMEGAMARKER® Temperature Test Kit"), 1995.*
Newman Tools, Inc., Brochure for "Nissen Temperature Indicating Sticks", Feb. 2000.*
Omega, Brochure for " OMEGAMARKER® Temperature Test Kit", No date.*

* cited by examiner

Primary Examiner—Christopher W. Fulton
Assistant Examiner—Mirellys Jagan
(74) Attorney, Agent, or Firm—Ziolkowski Patent Solutions Group, LLC

(57) ABSTRACT

An apparatus to combine temperature indicator sticks used in the welding, metal fabrication, and heat treatment industries and capable of identifying a given temperature of an object is disclosed. The apparatus includes a first temperature indicator stick comprised of a compound which melts at a first temperature, and a second temperature indicator stick formed of another compound which melts at a second temperature. The Apparatus further includes a connector physically connecting the first and second indicator sticks in a single assembly. A method to provide a dual temperature indicator stick is also disclosed.

31 Claims, 3 Drawing Sheets

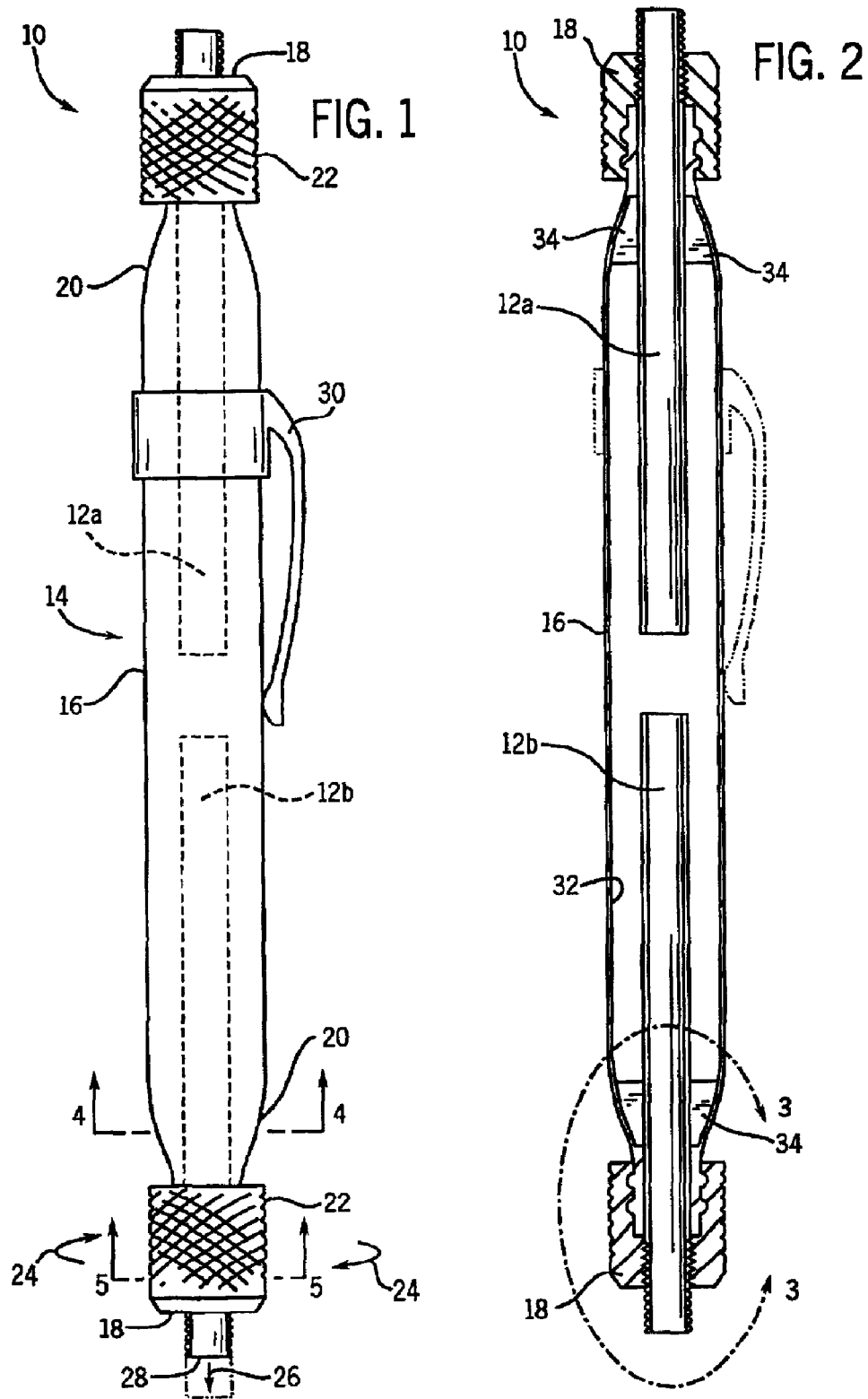

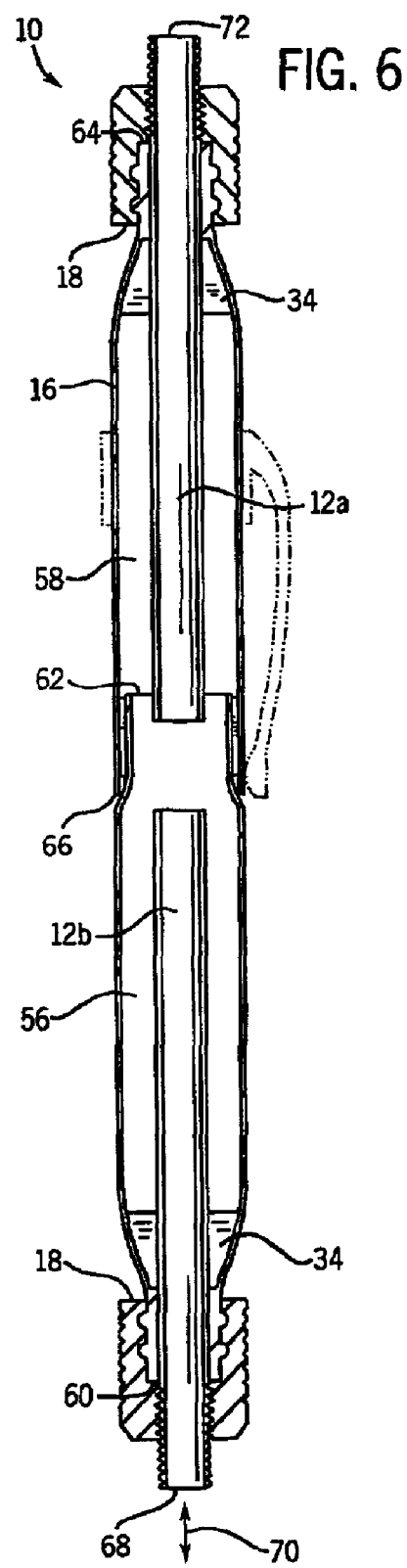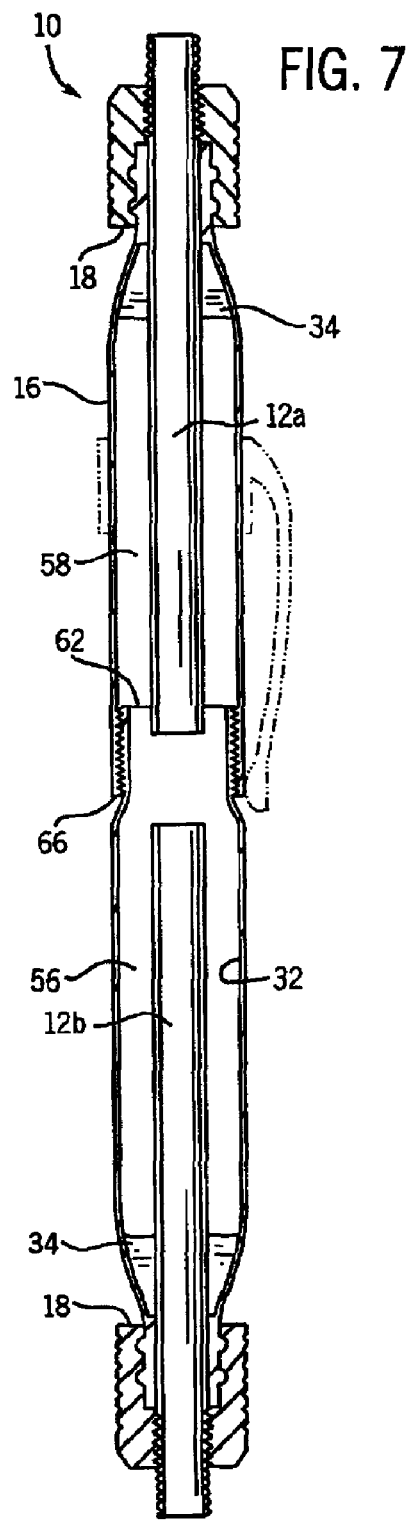

DUAL TEMPERATURE INDICATOR STICK HOLDER

BACKGROUND OF THE INVENTION

The present invention relates generally to temperature indicators, and more particularly, to an apparatus and method to independently extend and retract a pair of temperature indictor sticks.

Temperature indicators are well known in the welding, metal fabrication, and heat treatment industries. Such products are capable of determining surface temperatures during welding and metal fabrication processes. The products have also found use in heat-treatment processes, and can determine operating temperatures of mechanical, hydraulic, and electrical systems and components, such as transformers and motors.

Initially, temperature sensing was conducted by sprinkling a few granules of a known compound on an object. When the granules melted, the desired temperature was achieved. Later, pellets were introduced to make marks similar to a chalk mark on a surface of the object rather than observing the entire pellet melt. Further improvements led from a pellet to a chalk stick, which is protected in a housing that includes an adjustable holder for positioning the temperature indicator stick relative to the housing.

One known temperature indicator includes a housing having a rimmed end and a flanged end. A temperature indicator stick is inserted into the housing through the flanged end and prevented from leaving the housing by the rimmed end. The stick also has an outer casing or holder that is threaded into the housing and encloses the flanges. The outer casing is tapered to constrict the flanges and lock the temperature indicator stick in a fixed position.

Problems exist with the current state of the art of temperature indicators. Existing holders for temperature indicators are not satisfactory. Such holders are often limited in their ability to fix the temperature indicator stick in position. Operator use of the temperature indicator stick results in pressure exerted on the end of the stick during marking which causes the stick to retract into the housing. Generally, the operator must unscrew the outer casing, reposition the temperature indicator stick, and then retighten the outer casing to continue marking objects. Another problem is that current temperature indicators are configured to hold one temperature indicator stick, limiting temperature detection to a single temperature value. Operators desiring to detect several temperatures must carry or locate multiple temperature indicators, which is often tedious.

There is a need for an apparatus and method capable of separately fixing a pair of temperature indicator sticks in position during the marking of objects for temperature detection to reduce the number of temperature indicators used by operators. It would therefore be desirable to have a more efficient temperature indicator than current indicators by having a pair of temperature indicator sticks within a housing such that a pair of collets having threads engage each temperature indicator stick independently.

BRIEF DESCRIPTION OF INVENTION

The present invention is directed to an apparatus and method to detect multiple temperatures with a single indicator stick to overcome the aforementioned concerns.

The present invention includes a pair of compounds formed into indicator sticks that melt at given temperatures. The indicator sticks are rated to measure the given temperatures, which are generally not the same value, during welding, heat treatment, and metal fabrication processes. The invention also includes a connector that connects the indicator sticks together.

In accordance with one aspect of the present invention, a dual temperature indicator stick is disclosed having a first indicator stick comprised of a compound which melts at a first given temperature. The dual temperature indicator stick further includes a second indicator stick comprised of a compound which melts at a second given temperature, and a connector. The connector physically connects the first and second indicator sticks in a single assembly.

In accordance with the process of the present invention, a method to provide a dual temperature indicator includes the steps of forming a first indicator stick of a compound which melts at a first given temperature, and forming a second indicator stick of a compound which melts at a second given temperature. The method also includes the step of connecting the first and second indicator sticks in a single assembly.

In a further aspect of the present invention, a dual temperature indicator stick apparatus is provided having a first means for indicating a first temperature, and a second means for indicating a second temperature. The apparatus also includes a means for retaining the first means to the second means to form a single indicator stick capable of indicating at least two temperatures.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 1 is a side, elevational view of a dual temperature indicator stick holder in accordance with one embodiment of the present invention.

FIG. 2 is a cross-sectional view of the apparatus of FIG. 1.

FIG. 6 is a view, similar to FIG. 2, of one alternative embodiment of a dual temperature indicator stick holder.

FIG. 7 is a view, similar to FIG. 2, of an alternative embodiment of a dual temperature indicator stick holder.

DETAILED DESCRIPTION

Figure 3:
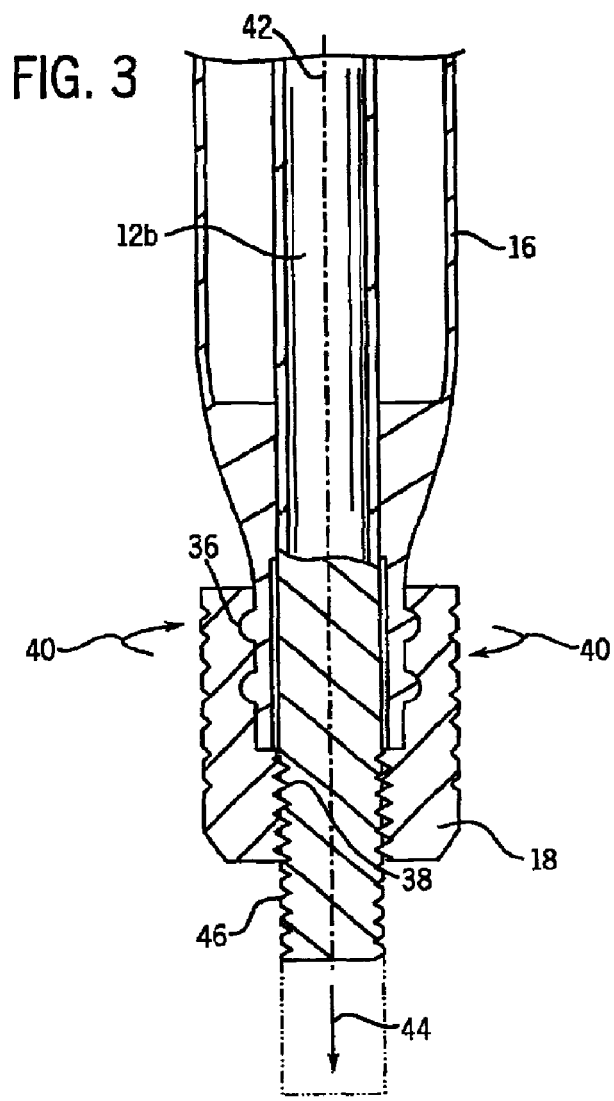
FIG. 3 is an enlarged partial view taken along line 3—3 of FIG. 2.

Various temperature detection monitors are used by the welding, metal fabrication and heat treatment industries to measure temperatures of materials. Determining surface temperatures is critical during welding and metal fabrication processes, such as pre-heat and post-weld heat treatment. Temperature monitoring is also important for determining operating temperatures of various mechanical, electrical, and hydraulic systems and components. These components, such as a motor or transformer, can be destroyed or alternatively have their device characteristics substantially altered if the components are not manufactured within a specified temperature range.

Several detection devices and methods exist to determine surface and operating temperatures. Some devices use gauges or electronic components having thermistors, whereas others use chemical compounds formed as temperature indicator sticks that feed through mechanical temperature indicators. Although each of these detection devices has advantages, temperature indicators have been found to be particularly useful due to their ease of use and inexpensive cost.

Referring now to FIG. 1, one embodiment of a dual temperature indicator stick 10 is shown. The dual temperature indicator stick 10 includes a first indicator stick 12a comprised of a compound which melts at a first given temperature, and a second indicator stick 12b comprised of a compound which melts at a second given temperature. Temperature indicator sticks are generally rated to measure a specific temperature between 100° F. and 2500° F., which is commonly marked on an exterior surface 14 of the housing 16. Often, the housing 16 is formed of a lightweight material, such as aluminum. In one embodiment for connecting a first indicator stick 12a to a second indicator stick 12b, a connector, such as a housing 16, physically connects the first and second indicator sticks 12a and 12b into a single assembly. A rotatable collet 18 connects to a tapered end 20 of the housing 16 and has finger grips 22 to facilitate collet rotation. Rotation of the collet 18 in the direction of arrows 24 (clockwise) causes the temperature indicator stick 12b to move in a direction of arrow 26 to permit use of an end 28 of the temperature indicator stick 12b for marking objects. In use, an operator can rotate the collet 18 as desired to extend the temperature indicator stick 12b from the housing 16. If the operator rotates the collet 18 in the reverse direction, opposite to arrows 24, then the temperature indicator stick 12b retracts into the housing 16 in a direction opposite to arrow 26. Indicator stick 12a is similarly extended and retracted into the housing 16 using the other collet 18. The apparatus can also include a pocket clip 30 configured to be adjustable along the housing 16 that permits attachment of the apparatus 10 to clothing apparel.

FIG. 2 is a cross-sectional view of the dual temperature indicator stick 10 of FIG. 1. Collets 18 are configured to control movement of the temperature indicator sticks 12a and 12b. An interior surface 32 of the housing 16 has a plurality of flanges 34 secured thereto and extending therefrom that encircle the temperature indicator sticks 12a and 12b. The flanges or pair of resistance mechanisms 34 oppose rotational movement of the temperature indicator sticks 12a and 12b in the direction shown by arrow 24 of FIG. 1 as well as the reverse rotational direction.

Referring now to FIG. 3, a detailed partial view taken along line 3—3 of FIG. 2. FIG. 3 is exemplary of both ends of the apparatus of FIGS. 1 and 2. The housing 16 has a pair of annular rings 36 and the collet 18 is coupled to the pair of annular rings 36 permitting rotation of the collet 18 about the housing 16. The collet 18 has a series of threads or threaded portion 38 that engages the temperature indicator stick 12b as the collet 18 rotates in the direction of arrows 40. Rotation of the collet 18 in a clockwise direction 40 causes the temperature indicator stick 12b to extend from the housing 16 along an axis 42 in the direction of arrow 44. During rotation, the threads 38 of the collet 18 cause the temperature indicator stick 12b to be threaded along an outer surface 46. Collet threads 38 prevent movement of the temperature indicator stick 12b in a direction opposite to arrow 44 unless the collet 18 is rotated in a reverse direction, that is, opposite to arrows 40. In alternative embodiments, the contoured ends 20 of the housing 16 may each include single annular rings 36 connectable to the collet 18 or more than two annular rings.

Figure 4:
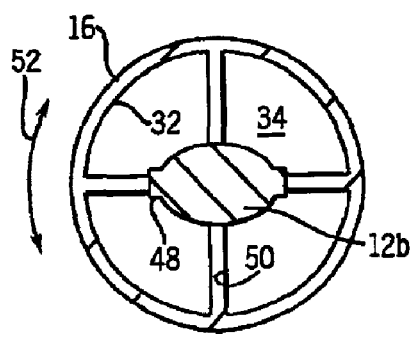
FIG. 4 is a cross-sectional view taken along line 4—4 of FIG. 1.

FIG. 4 is a cross-sectional view taken along line 4—4 of FIG. 1. Flanges 34 connect to the interior surface 32 of the housing 16. The temperature indicator stick 12b is aligned by each of the flanges 34 along axis 42, and has a generally oval shape. The temperature indicator stick 12b further includes a pair of ridges 48 that engage a side edge 50 of the flanges 34 to prevent rotational movement of the temperature indicator stick 12b in a direction of arrows 52. The contoured housing 16 assists in aligning the collet 18 with the ridges 48 of the temperature indicator stick 12b. Additionally, the alignment of the temperature indicator stick 12b along axis 42 permits engagement between the ridges 48 and the threaded member or collet 18.

Figure 5:
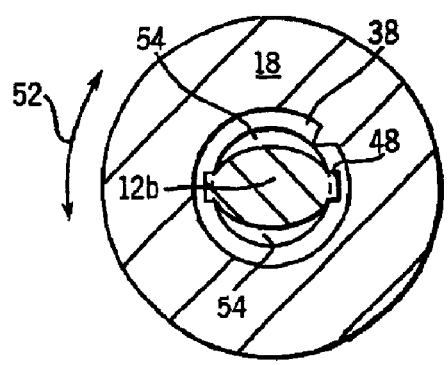
FIG. 5 is a cross-sectional view taken along line 5—5 of FIG. 1.

FIG. 5 is a cross-sectional view of the temperature indicator stick 12b partially threaded and is taken along line 5—5 of FIG. 1. Rotation of the collet 18 in the direction of arrows 52 causes the collet threads 38 to engage the ridge 48 of the temperature indicator stick 12b, which results in extension or retraction of the temperature indicator stick 12b. During the threading process, residue of the temperature indicator stick 12b is removed and deposited into a volume of space or air pocket 54. Preferably, the temperature indicator stick 12b has two ridges 48 and is oval-shaped to provide space 54 for temperature indicator stick residue. In one embodiment, the threads 38 are configured to engage only the ridges 48 only to create less temperature indicator stick residue. Other embodiments are also contemplated wherein the temperature indicator sticks 12a and 12b have other non-circular shapes and are within the scope of the present invention.

Referring now to FIG. 6, one alternative embodiment of a dual temperature indicator stick holder 10 is shown. The housing 16 includes a first element 56 and a second element 58 that enclose the temperature indicator sticks 12b and 12a respectively. The first element 56 has a collet end 60 and a union end 62. The second element 58 also has a collet end 64 and a union end 66. First element union end 62 is configured to slidingly secure into the union end 66 of the second element 58. Rotation of the collet 18 about the housing 16 of the first element 56 causes a first temperature stick end 68 to move in the direction of arrows 70 into or out of the housing 16. Similarly, rotation of the collet 18 about the housing 16 of the second element 58 causes a second temperature stick end 72 to also move in the direction of arrows 70. Flanges 34 prevent rotational movement of the temperature indicator sticks and are similar to the flanges of FIG. 1. Since the temperature indicator sticks 12a and 12b are independent from one another, each of the sticks can be separately extended and retracted from opposite collet ends 60, 64 of the housing 16.

FIG. 7 provides a second alternative embodiment of a dual temperature indicator stick holder 10. The housing 16 again has a first element 56 and a second element 58 that enclose two temperature indicator sticks 12a and 12b. Collets 18 and flanges 34 direct the independent movement of the two temperature indicator sticks 12a and 12b, as discussed with reference to FIG. 6. The union end 62 of the first element 56 is threaded to screw into the union end 66 of the second element 58. Preferably, the threading of the first and second elements 56, 58 is centrally located along the interior surface 32 of the housing 16. Although FIGS. 6 and 7 provide alternative embodiments of connecting first and second elements 56, 58, other connection mechanisms known to those skilled in the art to secure the first and second elements together are also contemplated and within the scope of the present invention.

In operation, the temperature indicator sticks can be inserted into the housing in different ways. The collets can be removed from the housing permitting access to the interior of the housing. Alternatively, the temperature indicator sticks 12a and 12b can be reverse threaded into the housing. In the alternative embodiments shown in FIGS. 6 and 7, the first and second elements can be first disconnected and then have the temperature indicator sticks inserted into the union ends of the first and second elements prior to joining the elements together to form the dual temperature indicator stick housing.

In accordance with one aspect of the present invention, a dual temperature indicator stick is disclosed having a first indicator stick comprised of a compound which melts at a first given temperature, and a second indicator stick comprised of a compound which melts at a second given temperature. A connector, such as a housing adapted to receive the first and second indicator sticks, physically connects the first and second indicator sticks in a single assembly.

In accordance with the process of the present invention, a method to provide a dual temperature indicator includes the step of forming a first indicator stick of a compound which melts at a first given temperature. The method also includes the steps of forming a second indicator stick of a compound which melts at a second given temperature, and connecting the first and second indicator sticks in a single assembly.

In yet another aspect of the present invention, a dual temperature indicator stick apparatus has a first means for indicating a first temperature, and a second means for indicating a second temperature. Such means can include a first and second temperature indicator stick. The apparatus further has a means for retaining the first means to the second means to form a single indicator stick capable of indicating at least two temperatures.

The present invention has been described in terms of the preferred embodiment, and it is recognized that equivalents, alternatives, and modifications, aside from those expressly stated, are possible and within the scope of the appending claims.

What is claimed is:

1. A dual temperature indicator stick assembly comprising:
   a first indicator stick comprised of a compound which melts at a first given temperature;
   a second indicator stick comprised of a second compound which melts at a second given temperature;
   a connector physically connecting the first and second indicator sticks in a single assembly such that the first and second indicator sticks are independently operable thereto; and
   a pair of extension mechanisms extending from the connector and constructed to independently and proportionally advance each of the indicator sticks upon rotation of the respective extension mechanism.

2. The dual temperature indicator stick assembly of claim 1 wherein the connector comprises:
   a housing having at least one annular ring and adapted to receive the first and second indicator sticks within the housing;
   a pair of resistance mechanisms attached to the housing to limit rotational movement of the first and second indicator sticks about an axis;
   wherein the pair of extension mechanisms includes a pair of collets having threads, each collet rotatably coupled to annular ring of the housing; and
   wherein each of the pair of collets is configured to engage separate temperature indicator sticks upon rotation of the collet about the housing.

3. The dual temperature indicator stick assembly of claim 1 further including a resistance mechanism attached to the connector to limit rotational movement of at least one of the first and second indicator sticks about an axis.

4. The dual temperature indicator stick assembly of claim 3 wherein the resistance mechanism has a plurality of flanges.

5. The dual temperature indicator stick assembly of claim 1 wherein each extension mechanism of the pair of extension mechanisms further comprises at least one collet having threads attached to the connector, the threads of the at least one collet configured to engage one of the first and second indicator sticks.

6. The dual temperature indicator stick assembly of claim 1 wherein at least one of the first and second indicator sticks has a ridge configured to engage threads of a collet of each of the extension mechanisms during extension of one of the first and second indicator sticks from each other.

7. The dual temperature indicator stick assembly of claim 1 wherein the connector comprises a first element and a second element, each element having a marking end and a union end.

8. The duel temperature indicator stick assembly of claim 7 wherein union ends of the first and second elements thread together.

9. The dual temperature indicator stick assembly of claim 1 wherein the connector prevents contact between the first and second indicator sticks.

10. A dual temperature indicator stick apparatus comprising:
    first means for indicating a first temperature when in direct contact with a heated surface by leaving a portion of the first means thereon;
    second means for indicating a second temperature when in direct contact with a heated surface by leaving a portion of the second means thereon;
    means the replaceably retaining the first means to the second means to form a single indicator stick capable of indicating at least two temperatures;
    means for advancing the first indicating means;
    means for advancing the second indicating means; and
    wherein rotation or a respective advancing means extends a corresponding indicating means in a controlled manner from the retaining means.

11. The apparatus of claim 10 further comprising a means for aligning the first and second means along an axis.

12. The apparatus of claim 10 further comprising a means for resisting rotational movement of the first and second indicating means about an axis.

13. The apparatus of claim 10 wherein each of the advancement means controls extension and retraction of the first and second means.

14. The apparatus of claim 10 wherein the first and second indicator means comprises a first temperature indicator stick and a second temperature indicator stick.

15. The apparatus of claim 10 wherein the means for retaining the first means to the second means comprises a connector.

16. A dual temperature indicator stick assembly comprising:
    a first indicator stick comprised of a compound which melts at a first given temperature;
    a second indicator stick comprised of a second compound which melts at a second given temperature;

a connector physically connecting the first and second indicator sticks in a single assembly; and collets having threads attached to the connector, the threads of each collet configured to engage one of the first and second indicator sticks.

17. A method to provide a dual temperature indicator stick assembly comprising:

forming a first indicator stick of a compound which melts at a first given temperature;

forming, a second indicator stick of a compound which melts at a second given temperature;

connecting the first and second indicator sticks in a single assembly to permit movement of the first indicator stick independent of the second indicator stick; and forming a first and a second extension mechanism connected to the single assembly and constructed to engage and extend the first and the second indicator sticks from the assembly upon rotation of each respective extension mechanism.

18. The method of claim 17 further including the step of aligning the first and second indicator sticks along an axis.

19. The method of claim 17 further including the step of preventing rotational movement of the first and second indicator sticks about an axis.

20. The method of claim 17 wherein the single assembly comprises a housing having two threaded members connected thereto to engage the first and second indicator sticks.

21. The method of claim 20 wherein the first and second indicator sticks are formed in an oval shape to provide a volume of space for indicator stick residue within the two threaded members.

22. A dual temperature indicator stick assembly comprising:

a first indicator slick comprised of a compound which melts at a first given temperature;

a second indicator stick comprised of a second compound which melts at a second given temperature; and a connector physically connecting the first and second indicator sticks in a single assembly wherein at least one of the first and second indicator sticks has a ridge configured to engage threads of a collet during extension of one of the first and second indicator sticks from each other.

23. A dual temperature indicator stick assembly comprising:

a first indicator stick comprised of a compound which melts at a first given temperature;

a second indicator stick comprised of a second compound which melts at a second given temperature; and a connector physically connecting the first and second indicator sticks in a single assembly wherein the connector comprises a first element and a second element, each element having a marking end and a union end wherein each union end of the first and second elements extend beyond an end of a respective indicator stick housed therein and thread together and each marking end has an extension member connected thereto, the extension member constructed to extend and retract a respective indicator stick housed therein in a controlled manner by rotation relative thereto.

24. A method to provide a dual temperature indicator stick assembly comprising:

forming a first indicator stick having an oval shape of a compound which melts at a first given temperature;

forming a second indicator stick having an oval shape of a compound which melts at a second given temperature;

connecting the first and second indicator sticks in a single assembly such that the first indicator stick and the second indicator stick are independently engaged therewith; and wherein the single assembly comprises a housing having two threaded members connected thereto to engage the first and second indicator sticks and the oval shape of the indicator sticks provides a volume of space for indicator stick residue within the two threaded members.

25. A dual temperature indicator stick holder, the holder comprising:

a housing adapted to receive two temperature indicator sticks within the housing and having a pair of annular rings;

a pair of resistance mechanisms attached to the housing to limit rotational movement of the two temperature indicator sticks about an axis;

a pair of collets having threads, each collet rotatably coupled to a respective annular ring of the housing; and wherein each of the pair of collets is configured to engage separate temperature indicator sticks upon rotation of the collet about the housing.

26. The holder of claim 25 wherein the pair of resistance mechanisms each have a plurality of flanges.

27. The holder of claim 25 wherein the housing comprises a first element and a second element, each element having a collet end and a union end.

28. The holder of claim 27 wherein one of the union ends of the housing is configured to slidingly secure into the other union end.

29. The holder of claim 27 wherein the threads of each collet are constructed to engage a ridge of a temperature indicator stick to extend and retract the temperature indicator stick from the housing.

30. The holder of claim 29 wherein the housing is contoured at both ends to align the threads of each collet with the at least one ridge of each temperature indicator stick.

31. A dual temperature indicator stick assembly comprising:

a first indicator stick comprised of a first compound which melts at a first given temperature;

a second indicator stick comprised of a second compound which melts at a second given temperature; and a connector physically connecting the first and second indicator sticks in a single assembly wherein the connector comprises:

a housing having a pair of annular lips and adapted to receive the first and second indicator sticks within the housing;

a pair of resistance mechanisms attached to the housing to limit rotational movement of the first and second indicator sticks about an axis;

a pair of collets having threads, each collet rotatably coupled to a respective annular lip of the housing; and wherein each of the pair of collets is configured to engage separate temperature indicator sticks upon rotation of the edict about the housing.

* * * * *

UNITED STATES PATENT AND TRADEMARK OFFICE
CERTIFICATE OF CORRECTION

PATENT NO. : 6,857,777 B2 Page 1 of 1
DATED : February 22, 2005
INVENTOR(S) : Desai et al.

It is certified that error appears in the above-identified patent and that said Letters Patent is hereby corrected as shown below:

Column 5,
Line 68, insert the word -- an -- before "annular";

Column 7,
Line 10, delete "," after the word "forming".

Signed and Sealed this

Seventeenth Day of May, 2005

JON W. DUDAS
*Director of the United States Patent and Trademark Office*